(12) United States Patent
Howe et al.

(10) Patent No.: US 10,539,159 B2
(45) Date of Patent: Jan. 21, 2020

(54) TWO-PIECE SHAFT ASSEMBLY FOR DRIVEN TURBOCHARGER

(71) Applicant: SUPERTURBO TECHNOLOGIES INC., Loveland, CO (US)

(72) Inventors: Jared Howe, Loveland, CO (US); Barry D. Suelter, Loveland, CO (US); Jared William Brown, Loveland, CO (US)

(73) Assignee: SuperTurbo Technologies, Inc., Loveland, CO (US)

( * ) Notice: Subject to any disclaimer, the term of this patent is extended or adjusted under 35 U.S.C. 154(b) by 224 days.

(21) Appl. No.: 15/483,092

(22) Filed: Apr. 10, 2017

(65) Prior Publication Data

US 2017/0298957 A1    Oct. 19, 2017

Related U.S. Application Data

(60) Provisional application No. 62/322,657, filed on Apr. 14, 2016.

(51) Int. Cl.
| | |
|---|---|
| *F02B 37/00* | (2006.01) |
| *F02B 39/04* | (2006.01) |
| *F04D 29/054* | (2006.01) |
| *F04D 29/66* | (2006.01) |

(52) U.S. Cl.
CPC ............ *F04D 29/668* (2013.01); *F02B 37/00* (2013.01); *F02B 39/04* (2013.01); *F04D 29/054* (2013.01)

(58) Field of Classification Search
CPC ........ F02B 37/105; F02B 39/04; F02B 41/10; F16H 13/06; F16H 13/08; F16H 13/10; F16H 13/14
See application file for complete search history.

(56) References Cited

U.S. PATENT DOCUMENTS

| | | | | |
|---|---|---|---|---|
| 757,014 | A * | 4/1904 | Berglund et al. ....... | F16H 13/14 475/195 |
| 3,060,767 | A * | 10/1962 | Parrett .................... | F16H 13/06 475/183 |
| 5,122,099 | A * | 6/1992 | Boedo ..................... | F16H 15/56 475/185 |
| 5,689,994 | A * | 11/1997 | Nagai ...................... | B23Q 1/25 310/80 |
| 8,561,403 | B2 | 10/2013 | Vandyne et al. | |

(Continued)

FOREIGN PATENT DOCUMENTS

| | | | | |
|---|---|---|---|---|
| CA | 2968616 A1 * | 8/2015 | ............. | F16H 13/08 |
| DE | 102013208660 A1 * | 11/2014 | ........... | F16H 37/022 |

(Continued)

OTHER PUBLICATIONS

JP 60101353 Chikamori, Published Jun. 1985. English Translation.*

*Primary Examiner* — Jason D Shanske
*Assistant Examiner* — Jessica L Kebea
(74) *Attorney, Agent, or Firm* — William W. Cochran; Cochran Freund & Young LLC

(57) ABSTRACT

Disclosed is a two-piece shaft assembly for a driven turbocharger with a traction drive. The turbo shaft is attached to a turbine and compressor, and is inserted into a traction barrel that has traction surfaces to mate to the traction drive. In this way, the traction drive can be assembled with only the traction barrel, and the turbo shaft can be inserted through the barrel at the end to simplify assembly.

22 Claims, 7 Drawing Sheets

(56) References Cited

U.S. PATENT DOCUMENTS

| | | | |
|---|---|---|---|
| 8,608,609 B2 | 12/2013 | Sherrill et al. | |
| 8,668,614 B2 | 3/2014 | Sherrill et al. | |
| 2003/0134709 A1* | 7/2003 | Ai | F16H 13/02 475/193 |
| 2003/0141479 A1* | 7/2003 | Witzel | F16H 13/06 251/305 |
| 2004/0209724 A1* | 10/2004 | Ai | F16H 13/06 475/197 |
| 2015/0141188 A1 | 5/2015 | Sherrill et al. | |
| 2016/0146096 A1 | 5/2016 | Sherrill et al. | |

FOREIGN PATENT DOCUMENTS

| | | | | |
|---|---|---|---|---|
| DE | 102014209624 A1 | * | 11/2015 | ............... F01N 5/02 |
| GB | 579043 A | * | 7/1946 | ............ F16H 13/06 |
| JP | 60101353 | * | 6/1985 | ............. F16H 13/08 |

\* cited by examiner

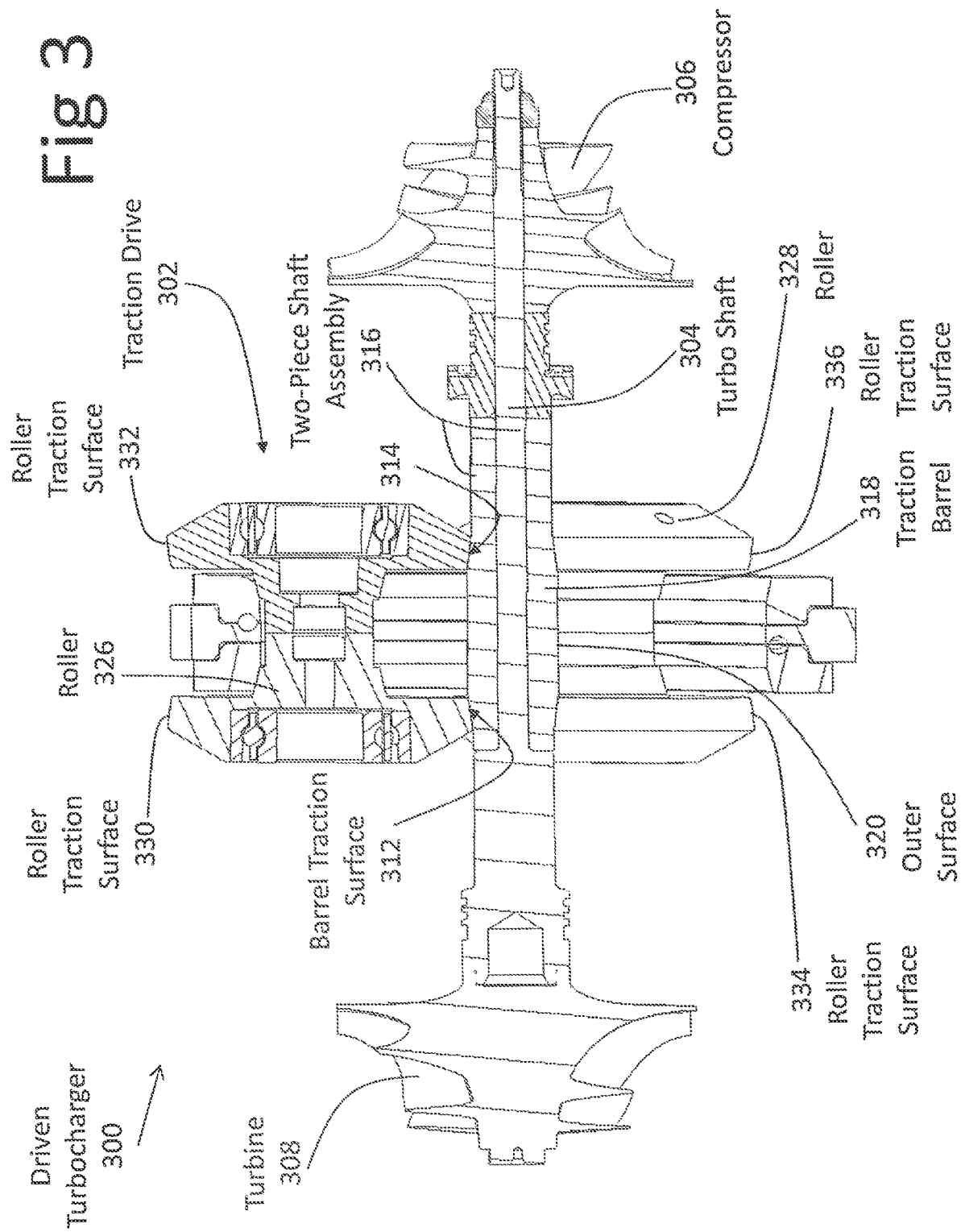

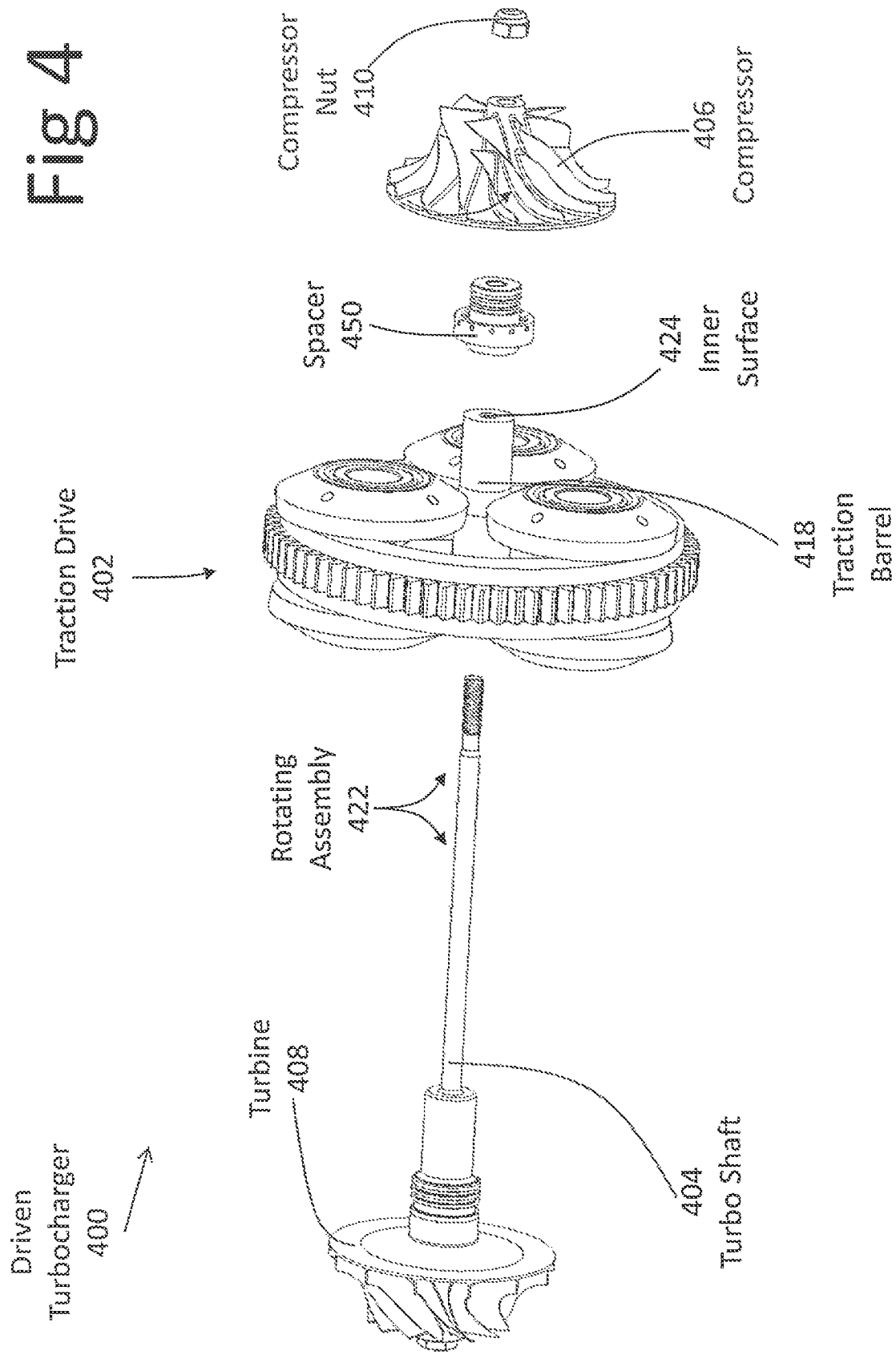

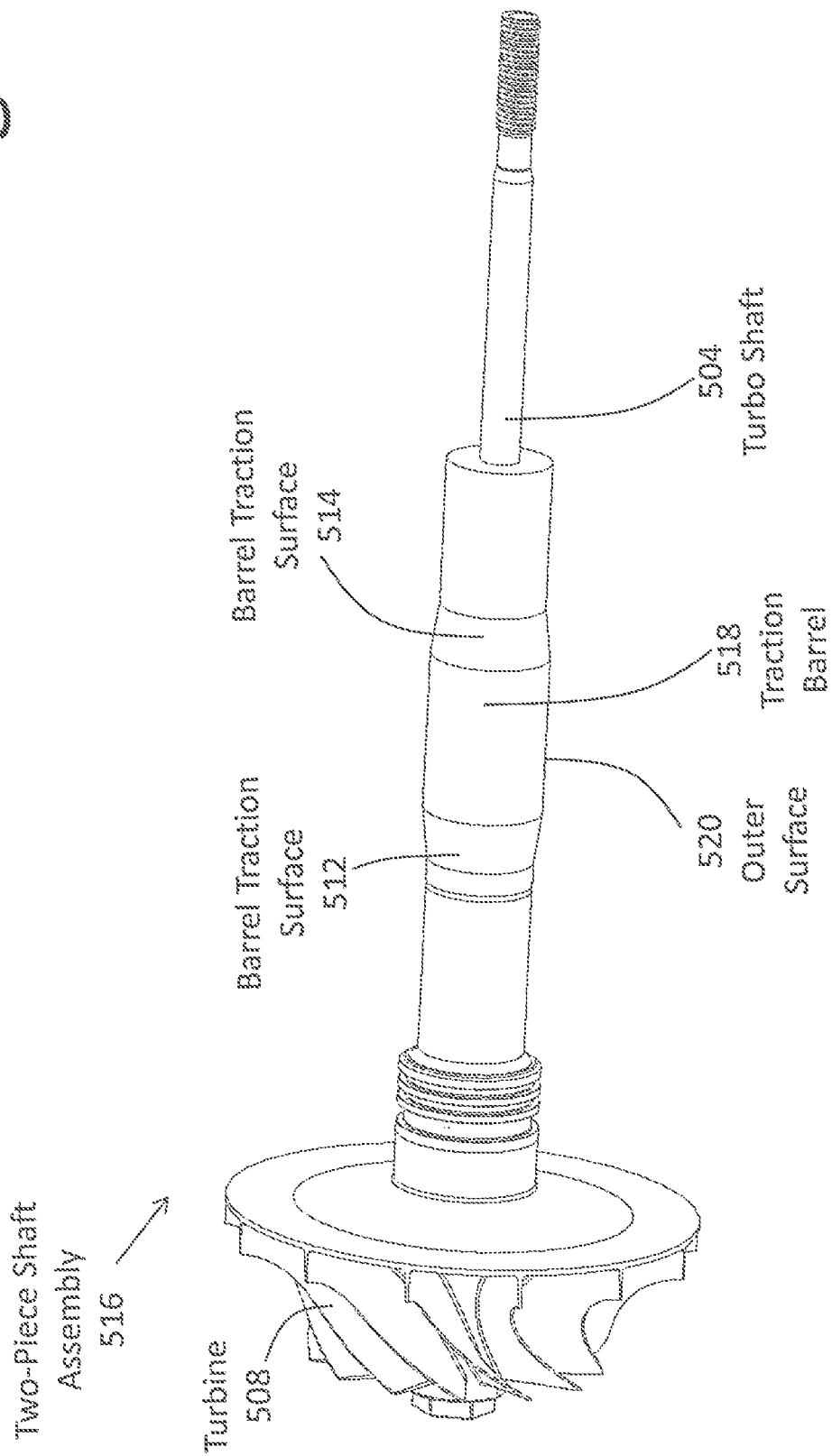

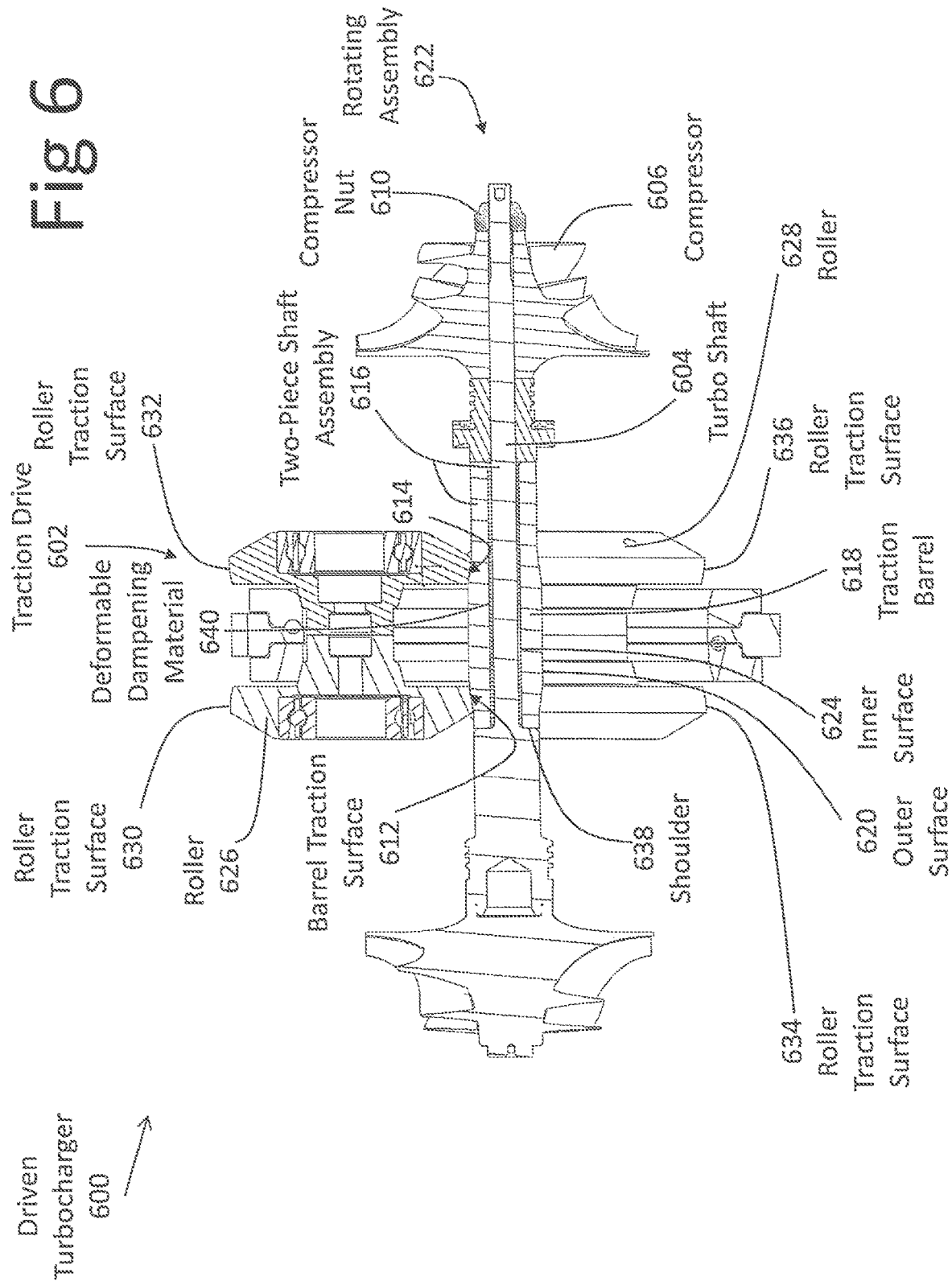

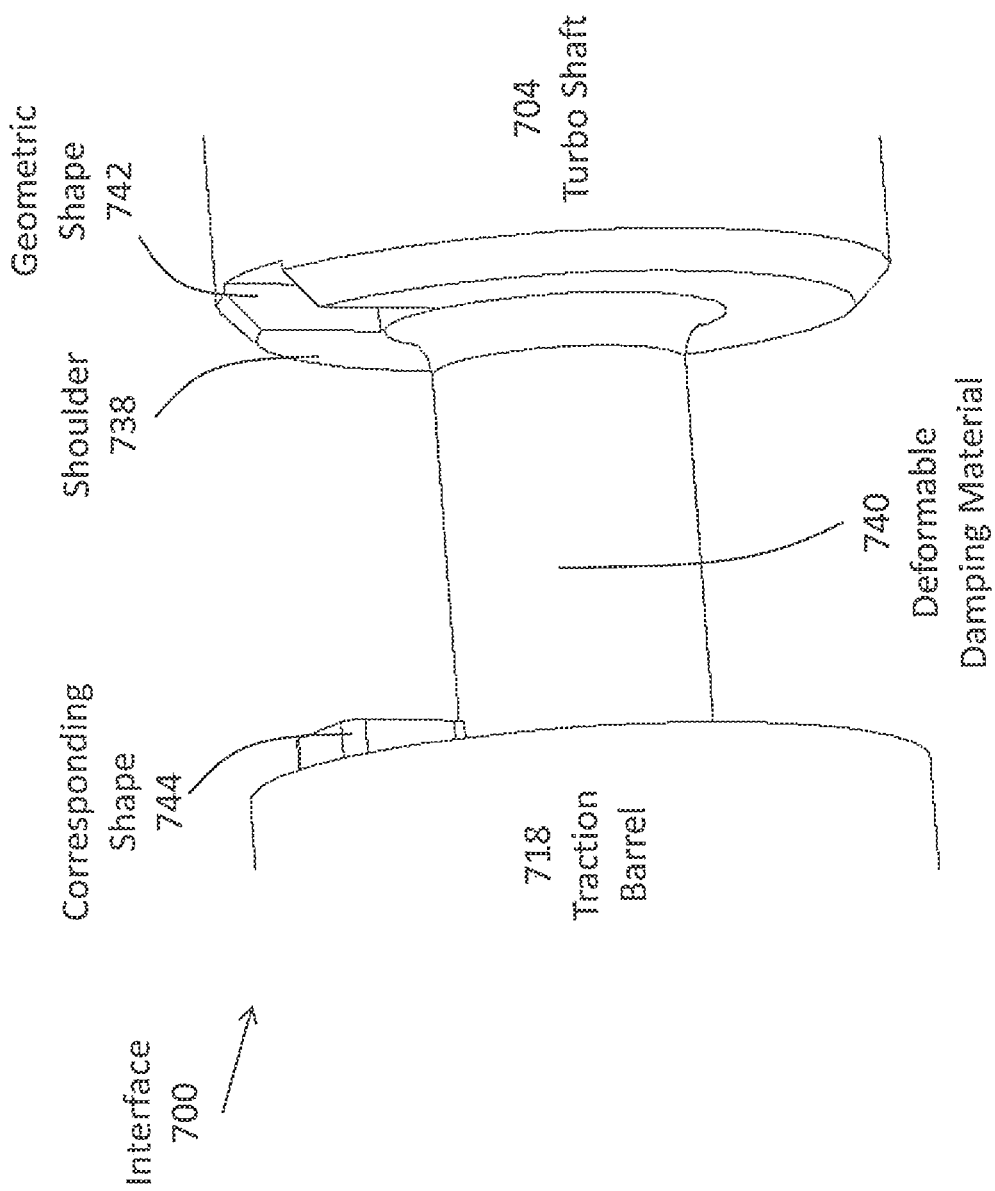

TWO-PIECE SHAFT ASSEMBLY FOR DRIVEN TURBOCHARGER

BACKGROUND

Driven turbochargers are an improvement over normal turbochargers since driven turbochargers (super-turbochargers) are powered by more than just the exhaust gas turbine, which reduces turbo-lag in boosted engines. Driven turbochargers can also direct excess turbine power back to the engine to increase engine efficiency. One class of driven turbocharger utilizes a traction drive that interfaces with the turbo shaft to provide torque to and from the turbo shaft.

SUMMARY

An embodiment of the present invention may therefore comprise a driven turbocharger for an engine system comprising: a turbo shaft; a compressor connected to a first location on the turbo shaft; a turbine connected to a second location on the turbo shaft; a traction barrel coaxially surrounding and connected to the turbo shaft such that an inner surface of the traction barrel pilots the turbo shaft and an outer surface of the traction barrel comprises at least one barrel traction surface; at least one roller with a roller traction surface in contact with the barrel traction surface that transfers torque to and from the traction barrel.

An embodiment of the present invention may therefore further comprise a method of assembling a driven turbocharger comprising: assembling a traction drive with a traction barrel to create a traction interface between the traction drive and the traction barrel; inserting a turbo shaft through a central opening in the traction barrel so that the turbo shaft is concentrically located in the traction barrel; securing the turbo shaft to the traction barrel so that torque can be transmitted between the turbo shaft and the traction barrel.

An embodiment of the present invention may therefore further comprise a method of assembling a driven turbocharger comprising: assembling a turbo shaft with a traction barrel; securing the turbo shaft to the traction barrel to form a two-piece shaft assembly so that torque can be transmitted between the turbo shaft and the traction barrel; inserting the two-piece shaft assembly into a traction drive such that torque is transferred between the traction drive and at least one barrel traction surface on the traction barrel.

BRIEF DESCRIPTION OF THE DRAWINGS

FIG. 3 is a cross section of a driven turbocharger with thrust absorbing, shaped traction surfaces.

FIG. 4 is an exploded view of the driven turbocharger.

FIG. 5 is an isometric view of the two-piece shaft assembly.

FIG. 6 shows a cross section of an alternative embodiment of a driven turbocharger with a two-piece shaft assembly.

FIG. 7 is a close-up schematic view of an alternative embodiment of the interface between a shoulder of the turbo shaft and traction barrel.

DETAILED DESCRIPTION OF THE EMBODIMENTS

Figure 1:
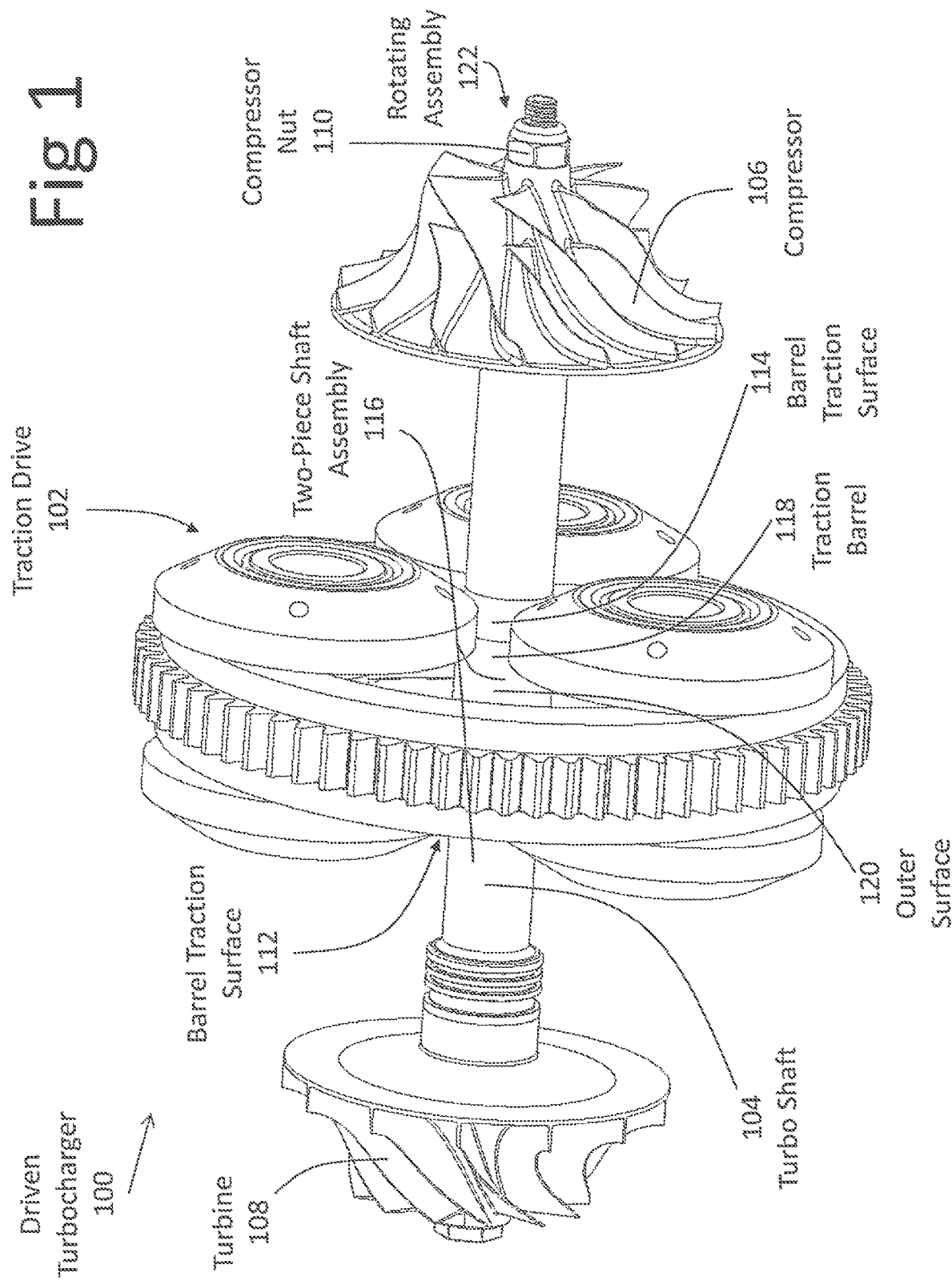
FIG. 1 is an isometric view of a driven turbocharger with a traction drive.

FIG. 1 is an isometric view of a driven turbocharger 100 with a traction drive 102. Turbo shaft 104 has a compressor 106 and a turbine 108 attached to each end. For a normal turbocharger, turbine 108 is usually welded to turbo shaft 104, but can be attached in any desired manner. Turbo shaft 104 is inserted through a central housing, and compressor 106 is secured to turbo shaft 104 by tightening compressor nut 110. The addition of traction drive 102 complicates the assembly of the driven turbocharger 100 since turbo shaft 104 additionally has traction surfaces, i.e., traction surfaces 112, 114, that mate to traction drive 102. One way to simplify the assembly of the driven turbocharger 100 is to have a two-piece shaft assembly 116, in which traction barrel 118 has barrel traction surfaces 112, 114 on an outer surface 120, allowing traction drive 102 to be fully assembled without turbo shaft 104. Two-piece shaft assembly 116 also allows for different materials to be used for two-piece shaft assembly 116, so that a material optimized for traction surfaces 112, 114 can be used to manufacture traction barrel 118, and a different material can be used to manufacture turbo shaft 104. Turbo shaft 104 is then inserted into traction barrel 118, compressor 106 is positioned onto turbo shaft 104, and compressor nut 110 is tightened to hold the rotating assembly 122 together. In this embodiment, rotating assembly 122 is comprised of turbo shaft 104, turbine 108, traction barrel 118, and compressor 106. Of course, the turbo shaft can be welded, or otherwise securely connected, to the compressor and the turbo shaft can be then inserted from the compressor side through the traction drive 102. The turbine 108 can then be connected to the turbo shaft 104 in any desired manner. The traction drive 102 can have various designs, as taught in U.S. Pat. No. 8,561,403, issued Oct. 22, 2013, entitled "Super-Turbocharger Having a High Speed Traction Drive and a Continuously Variable Transmission," U.S. Pat. No. 8,668,614, issued Mar. 11, 2014, entitled "High Torque Traction Drive," U.S. Pat. No. 8,608,609, issued Dec. 17, 2013, entitled "Symmetrical Traction Drive," U.S. patent application Ser. No. 14/511,250, filed Oct. 10, 2014, entitled "Thrust Absorbing Planetary Traction Drive Superturbo," and U.S. patent application Ser. No. 14/935,541, filed Nov. 9, 2015, entitled "Eccentric Planetary Traction Drive Super-Turbocharger." U.S. Pat. Nos. 8,561,403, 8,668,614, 8,608,609 and applications Ser. Nos. 14/511,250 and 14/935,541, are all specifically incorporated herein by reference for all that they disclose and teach.

Figure 2:
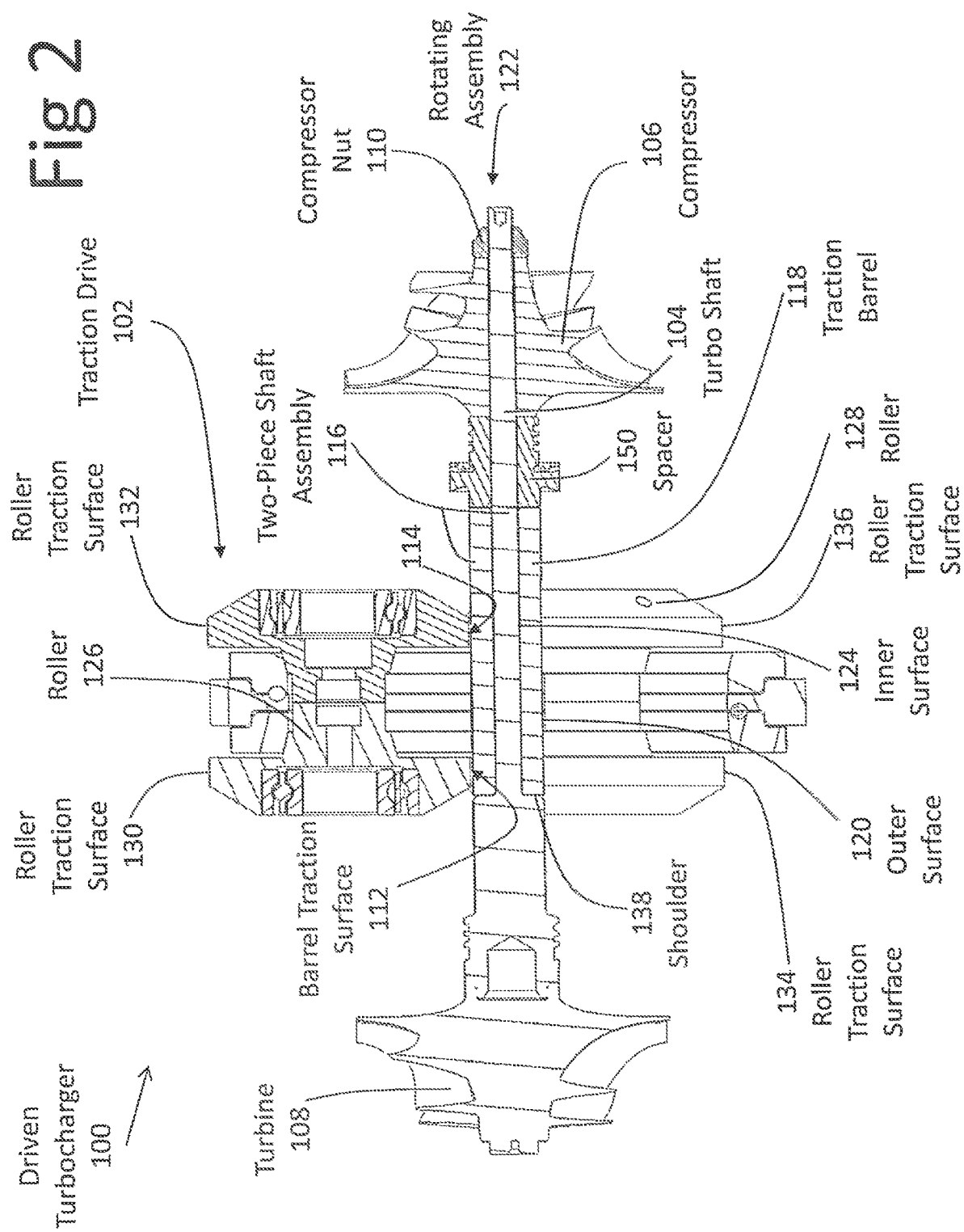
FIG. 2 is a schematic cross-sectional view of the driven turbocharger in FIG. 1 showing the two-piece shaft assembly.

FIG. 2 is a schematic cross-sectional view of the driven turbocharger 100 in FIG. 1 showing the two-piece shaft assembly 116. Traction barrel 118 has an inner surface 124 and barrel traction surfaces 112, 114 formed on an outer surface 120. Traction drive 102 comprises rollers 126, 128 that have roller traction surfaces 130, 132, 134, 136 that mate with barrel traction surfaces 112, 114 to transfer torque between traction barrel 118 and rollers 126, 128. Turbo shaft 104 is inserted into traction barrel 118 and piloted on inner surface 124 of traction barrel 118. Traction barrel 118 and turbo shaft 104 are manufactured to be coaxial so that balanced rotation of turbo shaft 104 is achieved, and together comprise two-piece shaft assembly 116. As shown in the embodiment, a shoulder 138 can be formed on turbo shaft 104 that is then pressed against one side of traction barrel 118 to locate turbo shaft 104 axially. Additionally, shoulder 138 allows compressor nut 110 to be tightened against compressor 106 and subsequently traction barrel 118, axially clamping rotating assembly 122 together. Also shown is a spacer 150 that is located between traction barrel 118 and compressor 106 that allows for machining of a separate piece for shaft seals. Spacer 150 may be integrated into compressor 106 or traction barrel 118, or can be a separate piece to simplify manufacturing. In this manner, shoulder 138 on turbo shaft 104 provides a reactive force to the tightening of compressor nut 110.

Once assembled, turbo shaft 104 and traction barrel 118 are rigidly connected to form two-piece shaft assembly 116. This rigid connection can be achieved in a variety of ways. One method would be a frictional connection between turbo shaft 104 and traction barrel 118. The friction can be generated by either an interference fit of turbo shaft 104 inside traction barrel 118, or through tightening compressor nut 110 to clamp traction barrel 118 against shoulder 138. Another method of rigidly connecting turbo shaft 104 and traction barrel 118 would be to use an adhesive between the two parts, or to weld the two parts together after assembly.

FIG. 3 is a cross section of a driven turbocharger 300 with thrust absorbing, shaped traction surfaces used for traction drive 302. The two-piece shaft assembly 316 is effectively the same as described above, but the barrel traction surfaces 312, 314 that are formed on outer surface 320 of traction barrel 318 are shaped. Roller traction surfaces 330, 332, 334, 336 are also shaped to interface with barrel traction surfaces 312, 314. In this way, thrust forces on turbo shaft 304 from compressor 306 and turbine 308 are absorbed by rollers 326, 328 as taught in U.S. patent application Ser. No. 14/511,250, filed Oct. 10, 2014, entitled "Thrust Absorbing Planetary Traction Drive Superturbo," which has been specifically incorporated herein by reference for all that it discloses and teaches.

FIG. 4 is an exploded view of a driven turbocharger 400. Traction drive 402 is illustrated as being fully assembled, with traction barrel 418 installed in the traction drive 402. As shown, traction drive 402 can be assembled independently of turbo shaft 404. To finish assembly of the driven turbocharger 400, turbo shaft 404 is inserted into traction barrel 418, spacer 450 and compressor 406. Compressor nut 410 is then tightened to clamp rotating assembly 422 together. This ability to separately assemble the traction drive 402 and insert the turbo shaft 404 in the assembled traction drive 402 simplifies the assembly process, and also allows for additional flexibility in design. The diameter of turbo shaft 404 can be varied depending on the shaft dynamics of different sizes of compressor 406 and turbine 408 for different engines, and the only resulting change to traction drive 402 is a corresponding change to the diameter of inner surface 424 of traction barrel 418. The diameter of turbo shaft 404 between traction barrel 418 and turbine 408 can be smaller than the diameter of a one-piece shaft, allowing seals around turbo shaft 404 to be smaller.

FIG. 5 is an isometric view of the two-piece shaft assembly 516. Traction barrel 518 is installed on turbo shaft 504. One option for manufacturing, prior to assembly of the traction drives shown in previous figures, is to assemble two-piece shaft assembly 516 for finish machining of outer surface 520 of traction barrel 518, including barrel traction surfaces 512, 514. Final machining of these parts with two-piece shaft assembly 516 assembled allows for better concentricity of turbine 508 and barrel traction surfaces 512, 514, resulting in lower runout and more balanced rotation of two-piece shaft assembly 516 once fully installed. Once finish machining is completed, traction barrel 518 can be removed from turbo shaft 504, and assembly of the traction drive as shown in previous figures can be done.

FIG. 6 shows a cross section of an alternative embodiment of a driven turbocharger 600 with a two-piece shaft assembly 616. This embodiment is functionally the same as the previously shown embodiments, except that a deformable dampening material 640 is located between turbo shaft 604 and traction barrel 618. This deformable dampening material 640 may be an elastic rubber or silicon type material or similar, and is used to dampen vibrations from turbo shaft 604 when turbo shaft 604 is spinning at high rotational speeds. Inner surface 624 of traction barrel 618 contacts deformable dampening material 640, which in turn contacts turbo shaft 604. The traction drive 602 is effectively unchanged from previous figures, where barrel traction surfaces 612, 614 are formed on an outer surface 620 of traction barrel 618, and mate with roller traction surfaces 630, 632, 634, 636 of rollers 626, 628. Compressor nut 610 is tightened onto turbo shaft 604 to clamp compressor 606, traction barrel 618, and turbo shaft 604 together into rotating assembly 622. Shoulder 638 on turbo shaft 604 provides a reaction force to the clamping of compressor nut 610, as well as locating turbo shaft 604 axially with respect to traction barrel 618.

FIG. 7 is a close-up schematic view of an alternative embodiment of the interface 700 between shoulder 738 of turbo shaft 704 and traction barrel 718. Turbo shaft 704 and traction barrel 718 need to be rotationally locked together in order for traction barrel 718 to transmit torque to and from turbo shaft 704. One option is for shoulder 738 to have a geometric shape 742 that rotationally interlocks with a corresponding shape 744 on traction barrel 718. This geometric shape 742 and corresponding shape 744 can be as simple as anti-rotation pins, a rib arranged in a slot, or as complex as a spline or other type of keyed interface. Various other shapes are possible, and would be known to a person skilled in the art. These interlocking shapes 742, 744 provide an alternative to friction, adhesives, or welds between turbo shaft 704 and traction barrel 718. Also shown is deformable dampening material 740 between turbo shaft 704 and traction barrel 718 as shown in FIG. 6. The interlocking shapes 742, 744 avert the need for deformable dampening material 740 to provide any rotational resistance between turbo shaft 704 and traction barrel 718. These interlocking shapes 742, 744 can also be used in the embodiments shown in FIGS. 1-5.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A driven turbocharger for an engine system comprising:
   a continuous turbo shaft that rotates in said driven turbocharger to transfer rotational mechanical energy:
   a traction drive comprising:
   a traction barrel coaxially surrounding and connected to said continuous turbo shaft such that an inner surface of said traction barrel forms an opening through which said continuous turbo shaft is inserted, said traction barrel is formed of a single component, and an outer surface of said traction barrel comprising at least one barrel traction surface;
   at least one roller with at least one roller traction surface in contact with said at least one barrel traction surface to form a traction interface that transfers torque between said traction barrel and said at least one roller;

a turbine mounted to a first portion of said continuous turbo shaft;
a compressor mounted to a second portion of said continuous turbo shaft said first portion of said continuous shaft located on a first side of said traction drive and said second portion of said continuous turbo shaft located on a second side of said traction drive, so that said continuous shaft can be inserted through said traction drive and said traction barrel prior to connecting either or both of said turbine or said compressor to said continuous shaft.

2. The driven turbocharger of claim 1 where said traction barrel contacts a shoulder on said continuous turbo shaft to locate said continuous turbo shaft axially.

3. The driven turbocharger of claim 2 where said shoulder on said continuous turbo shaft has a geometric shape that rotationally interlocks with a corresponding shape on said traction barrel.

4. The driven turbocharger of claim 2 where a compressor nut is tightened to clamp said compressor axially against said traction barrel and said traction barrel axially against said shoulder on said continuous turbo shaft such that said continuous turbo shaft, said traction barrel, and said compressor are all held together as one rotating assembly.

5. The driven turbocharger of claim 1 where said at least one barrel traction surface and said at least one roller traction surface are shaped such that thrust forces on said continuous turbo shaft are absorbed by said at least one roller.

6. The driven turbocharger of claim 1 where said traction barrel is rigidly connected to said continuous turbo shaft by way of friction.

7. The driven turbocharger of claim 6 where said continuous turbo shaft has an interference fit inside said traction barrel to provide said friction.

8. The driven turbocharger of claim 1 where said traction barrel is rigidly connected to said continuous turbo shaft by an adhesive or weld.

9. The driven turbocharger of claim 1 wherein said at least one barrel traction surface is a machined surfaces that is machined with said traction barrel assembled on said continuous turbo shaft.

10. The driven turbocharger of claim 1 further comprising:
a deformable dampening material mounted between said continuous turbo shaft and said traction barrel that dampens vibrations of said continuous turbo shaft when spinning at high rotational speeds.

11. A method of assembling a driven turbocharger comprising:
assembling a traction drive with a traction barrel to create a traction interface between said traction drive and said traction barrel that rotate together as a single part;
inserting a turbo shaft having a continuous single shaft through a central opening in said traction barrel so that said continuous turbo shaft is concentrically located in said traction barrel;
securing said continuous turbo shaft to said traction barrel so that torque can be transmitted between said continuous turbo shaft and said traction drive;
attaching a turbine to a first portion of said continuous turbo shaft on a first side of said traction drive;
attaching a compressor to a second portion of said continuous turbo shaft on a second side of said traction drive that is opposite to said first side.

12. The method of claim 11 wherein said process of securing said continuous turbo shaft to said traction barrel comprises adhesively bonding said continuous turbo shaft and said traction barrel.

13. The method of claim 11 wherein said process of securing said continuous turbo shaft to said traction barrel comprises engaging a key between said continuous turbo shaft and said traction barrel.

14. The method of claim 11 wherein said process of securing said continuous turbo shaft to said traction barrel comprises creating an interference fit between said continuous turbo shaft and said traction barrel.

15. The method of claim 11 wherein said process of securing said continuous turbo shaft to said traction barrel comprises tightening a compressor nut onto said continuous turbo shaft to clamp said traction barrel against a shoulder on said continuous turbo shaft.

16. The method of claim 11 further comprising:
mounting a deformable dampening material between said continuous turbo shaft and said traction barrel.

17. A method of assembling a driven turbocharger comprising:
assembling a continuous turbo shaft with a traction barrel that rotate together as a single part;
securing said continuous turbo shaft to said traction barrel to form a two-piece shaft assembly so that torque can be transmitted between said continuous turbo shaft and said traction barrel;
inserting said two-piece shaft assembly into a traction drive such that torque is transferred between said traction drive and at least one barrel traction surface on said traction barrel;
attaching a turbine to a first portion of said continuous turbo shaft on a first side of said traction drive;
attaching a compressor to a second portion of said continuous turbo shaft on a second side of said traction drive that is opposite to said first side.

18. The method of claim 17 wherein said process of securing said continuous turbo shaft to said traction barrel comprises adhesively bonding said continuous turbo shaft and said traction barrel.

19. The method of claim 17 wherein said process of securing said continuous turbo shaft to said traction barrel comprises engaging a key between said continuous turbo shaft and said traction barrel.

20. The method of claim 17 wherein said process of securing said continuous turbo shaft to said traction barrel comprises creating an interference fit between said continuous turbo shaft and said traction barrel.

21. The method of claim 17 wherein said process of securing said continuous turbo shaft to said traction barrel comprises tightening a compressor nut onto said continuous turbo shaft to clamp said traction barrel against a shoulder on said continuous turbo shaft.

22. The method of claim 17 further comprising:
mounting a deformable dampening material between said continuous turbo shaft and said traction barrel.

* * * * *